United States Patent [19]

Ori

[11] Patent Number: 6,101,020

[45] Date of Patent: Aug. 8, 2000

[54] OPTICAL SCANNER

[75] Inventor: Tetsuya Ori, Kawaguchi, Japan

[73] Assignee: Fuji Photo Optical Co., Ltd., Omiya City, Japan

[21] Appl. No.: 09/453,314

[22] Filed: Dec. 3, 1999

[30] Foreign Application Priority Data

Dec. 8, 1998 [JP] Japan .................................. 10-348381

[51] Int. Cl.[7] .................................................. G02B 26/08
[52] U.S. Cl. ........................ 359/205; 359/206; 359/212; 359/216
[58] Field of Search ................... 359/205–219, 359/17, 19, 565, 566

[56] References Cited

U.S. PATENT DOCUMENTS 5,808,775  9/1998  Inagaki et al. ........................ 359/212

FOREIGN PATENT DOCUMENTS 10-068903  3/1998  Japan .

Primary Examiner—James Phan
Attorney, Agent, or Firm—Arnold International; Bruce Y. Arnold

[57] ABSTRACT

An optical scanner is provided that reduces chromatic aberration (focus error) due to mode hopping of a semiconductor laser light source and that can give high-resolution output applicable to digital copiers and optical printers even when using an imaging optical system having only a few lens elements. At least one surface of the collimating lens includes a zone plate diffractive optical surface which meets specified design conditions to ensure that the focus error due to mode hopping is acceptably small.

2 Claims, 1 Drawing Sheet

OPTICAL SCANNER

BACKGROUND OF THE INVENTION

An optical scanner that is widely used in digital copiers and optical printers uses a collimating lens to convert light from a light source into a nearly collimated light beam. The nearly-collimated beam is then formed into a line image by an anamorphic lens. A scanner/polarizer that is formed of a rotating polygon mirror, with a polarizing reflective surface on the polygon mirror surfaces, is located near the image-forming position of the line image. The polarized, scanning light beam reflected from the rotating polygon mirror is then collected by an image-forming optical system and the light is imaged onto a target, thereby forming a one-dimensional scan of the target. In such an optical scanner, demand for low cost and miniaturization has become stronger in recent years. Therefore, it is often the case that the collimating lens is formed of a single lens element and that the image-forming optical system is formed of a small number of lens elements, such as two.

One example where there has been an attempt to obtain an optical scanner fit for superfine printing in spite of the optical scanner being compact and formed of a small number of lens elements is the optical scanner described in Japanese Laid Open Patent Publication H10-68903. The scanner disclosed in this publication employs an optical system that is equipped with a diffractive optical element (DOE) that includes a zone plate phase structure. Because a DOE has a property that its relative dispersion is larger (i.e., its reciprocal relative dispersion is smaller) and because the sign of the dispersion is also opposite that of conventional (i.e., refractive) optical systems, DOE's have recently been used in many fields in order to obtain high-precision imaging with fewer lens elements. The optical scanner described in Japanese Laid Open Patent Publication H10-68903 employs a diffractive optical element that includes a zone plate phase structure for its image-forming optical system, as well as an anamorphic lens and collimating lens. Further, it corrects a main-scanning-direction magnification change and focus change due to temperature variation by use of the zone plate diffractive optical element. However, the light source of the optical scanner described in the said Japanese Laid Open Patent Publication H10-68903 is a semiconductor laser, and this type of light source displays a phenomenon known as mode hopping, which makes a high-resolution output difficult to obtain. Thus, it would be desirable to correct the focus error resulting from mode hopping when using a semiconductor laser light source in order to obtain a high-resolution output.

Mode hopping results in the wavelength of the light source shifting from the base wavelength. When there is mode hopping, the refractive index of the light when passing through each lens element changes due to the refractive index being a function of the wavelength. Thus, as the wavelength shifts due to mode hopping, chromatic aberrations result in what is termed a "focus error". This focus error can become a problem even when the chromatic aberration of the collimating lens is itself small, because this chromatic aberration becomes magnified on the scanning target by a ratio, as will now be described.

If we designate $F_1$ as the focal distance of the collimating lens and $F_2$ as the focal distance of the image-forming optical system, the chromatic aberration $\Delta_1$ (which equals $F_1/v_1$, where $v_1$ is the reciprocal relative disperson of the collimating lens material at the base wavelength ±20 nm) that is generated by the collimating lens is magnified by the factor $(F_2/F_1)^2$ at the scanning target. In other words, $\Delta'=\Delta_1 (F_2/F_1)^2$, as set forth in Equation 5, below. For example, using a commonly-used semiconductor laser having a base wavelength of 780 nm, the light source wavelength varies approximately within ±20 nm due to mode hopping. To calculate the chromatic aberration $\Delta_1$ caused by the collimating lens in this case, given: the focal distance of the collimating lens $F_1$ is 10 mm, the focal distance of the image-forming optical system $F_2$ is 210 mm, and the collimating lens material is made of BK-7 glass, which has a reciprocal relative dispersion $v_1=612$ (at the base wavelength $\lambda=780$ nm ±20 nm), then $\Delta_1$ equals only 0.016 mm. However, the chromatic aberration on the scanning target, $\Delta'$, equals 7.2 mm.

Thus, even if the chromatic aberration $\Delta_1$ generated at the collimating lens is small, the chromatic aberration $\Delta'$ on the scanning target easily becomes too large. Therefore, the lens design needs to make the de-focus tolerance on the scanning target be larger than $\Delta'$, and this becomes a difficult design problem if a high-resolution output is required.

With a small number of component lens elements, such as found in conventional arrangements that employ a collimating lens consisting of one lens element and an image-forming optical system consisting of a small number of component lens elements, the focus error due to wavelength shift cannot be prevented, and a high-resolution output has been difficult to attain. Therefore, an optical scanner is desired which can reduce focus errors due to mode hopping and which has a high resolution despite there being only a small number of component lens elements.

BRIEF SUMMARY OF THE INVENTION

This invention relates to an optical scanner of a digital copier, an optical printer, etc. that records or displays images, and specifically it relates to an optical scanner that uses a semiconductor laser as the light source, as well as a collimating lens and an image-forming optical system of simple construction.

An object of the invention is to provide an optical scanner having a high-resolution output even when using only a small number of component lens elements. This is accomplished by compensating for focus errors which otherwise result from mode hopping of a semiconductor laser. The compensation is provided by a zone plate diffraction optical element that satisfies certain design criteria so as to enable the zone plate diffraction optical element to compensate for focus errors caused by conventional, refractive optical elements when wavelength shifts due to mode hopping occur.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The optical scanner of this invention includes a semiconductor laser light source, a collimating lens that forms a nearly collimated light beam and with the collimating lens including a zone plate diffractive optical surface, an optical scanner/polarizer that repeatedly scans the nearly collimated light beam from the collimating lens and polarizes it, and an image-forming optical system that images the polarized light onto a target, wherein the following Condition (1) is satisfied.

$$|\Delta_1 \times F_2/F_1^2| < 0.01 \qquad \text{Condition (1)}$$

where $\Delta_1 = F_1^2 \times ((\nu_1 \times f_1)^{-1} + ((\nu_D \times f_D)^{-1})$, $F_1$ is the focal distance of the collimating lens, $F_2$ is the focal distance of the image-forming optical system, $f_1$ is the focal distance due to the refraction effect of the collimating lens, (i.e., without a zone plate diffractive surface being added)

$f_D$ is the focal distance of the zone plate diffractive section of the collimating lens, (i.e., with a zone plate diffractive surface being added)

$\nu_1$ is the reciprocal relative dispersion of the collimating lens material at the base wavelength ±20 nm, (i.e., without a diffraction optical surface being added) and $\nu_D$ is the reciprocal relative dispersion of the zone plate diffractive section of the collimating lens at the base wavelength ±20 nm (i.e., with a zone plate diffractive surface being added).

The optical scanner of this invention also satisfies the following Condition (2).

$$|\Delta_1 \times (F_2/F_1)^2 + \Delta_2| < F_2/100 \qquad \text{Condition (2)}$$

where $\Delta_1 = F_1^2 \times ((\nu_1 \times f_1)^{-1} + ((\nu_D \times f_D)^{-1})$ $\Delta_2 = F_2/\nu_2$ $\nu_2$ is the equivalent reciprocal relative dispersion of the image-forming optical system at the base wavelength ±20 nm, and $F_1$, $F_2$, $f_1$, $f_D$, $\nu_1$, and $\nu_D$ are as defined above.

Figure 1:
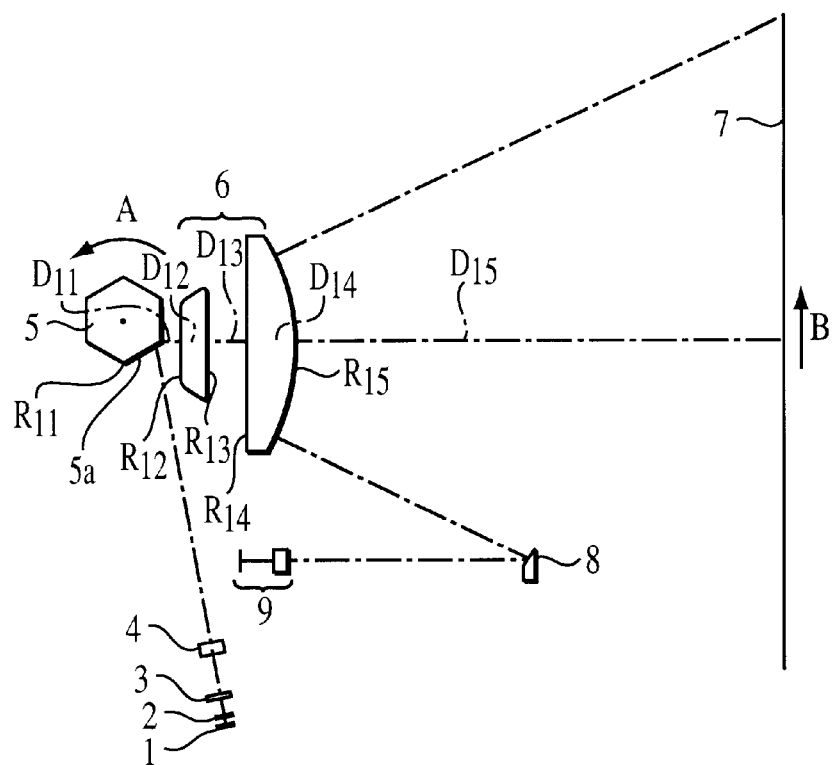
FIG. 1 shows an optical scanner of the present invention.
Figure 2:
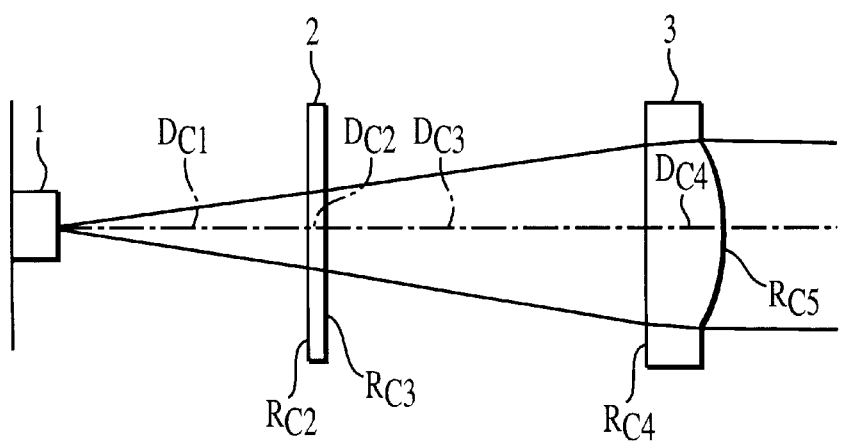
FIG. 2 shows an expanded view of a part of the optical scanner shown in FIG. 1, namely the part from the light source to the collimating lens.

FIG. 1 shows the basic construction of an optical scanner of Embodiments 1 and 2 of the invention, and FIG. 2 is an expanded view of FIG. 1 showing the basic construction from the light source to the collimating lens.

The optical scanner of both embodiments of the invention is equipped with a light source 1 formed of a semiconductor laser, a collimating lens 3 which converts light from the light source into a nearly-collimated beam, with at least one surface of the collimating lens including a zone plate diffractive optical surface, an optical scanner/polarizer 5 that scans and polarizes the nearly-collimated light beam, and an image-forming optical system 6 that collects the light from the optical scanner/polarizer 5 and images it onto the target 7 as a scanned beam.

As shown in FIG. 1 and FIG. 2, with this optical scanner the laser beam emitted from the light source 1 and passed through a cover glass 2 is converted by the collimating lens 3 into a nearly-collimated light flux and is formed into a line image by an anamorphic lens 4. A polygon mirror which forms part of the optical scanner/polarizer 5 has an optical polarizing reflective surface 5*a* near the image position of the light from the anamorphic lens 4. Thus the polygon mirror with polarizing reflective surface reflects and polarizes the laser beam. An image-forming optical system 6 formed of two lenses including an fθ lens collects the laser beam reflected and polarized by the optical scanner/polarizer 5 onto the scanning target 7 as a light spot, and scans it at an approximately equal angular speed on the scanning target. Also installed in this optical scanner is a light detector 9 to signal the start of a scan. Of course, other components may be inserted in the optical path, as may be desired or needed in a particular application.

As shown in FIG. 1, the laser beam emitted from the light source 1 is imaged onto a scanning target 7 and scans in the main scan direction (indicated by the arrow B) the scanning target 7 by means of the polygon mirror rotating in the direction of arrow A. Furthermore, the scanning target is moved in the sub scanning direction, thereby forming a two-dimensional image.

In the optical scanner of Embodiment 1, the collimating lens 3 surface nearest the scanning target 7 is formed with a zone plate diffractive optical surface thereon. This zone plate diffractive optical surface satisfies Condition (1) above, and has a surface depth given by Equation (1) below $$Z = ((BY^2 + 2n\pi)\lambda/2\pi(N-1)) + ((Y^2/R)/(1+((1-KY^2/R^2)^{1/2})) + A_2Y^4 + A_3Y^6 + A_4Y^8 + A_5Y^{10} \qquad \text{Equation (1)}$$

where

Z is the length along a perpendicular to the plane that is tangent to the vertex of the zone plate diffractive optical surface, from a point on the diffractive optical surface at height Y from the optical axis to the tangent plane, Y is the distance from the optical axis to the vertex of the zone plate diffractive optical surface, n is the zone number n (n=0, 1, 2, . . . ), B is a phase function coefficient, $A_2$, $A_3$, $A_4$, $A_5$ are non-spherical coefficients, N is the refractive index of material at the design base wavelength, K is the eccentricity, and R is the radius of paraxial curvature of the zone plate diffractive optical surface.

As described hereinafter, Condition (1) insures that the focus error on the scanning target 7 due to mode hopping is less than 1% of the focal distance of the image-forming optical system 6. By being equipped with a zone plate diffractive optical surface that satisfies Condition (1), focus error on the scanning target 7 due to mode hopping can be made small, as will now be explained.

As mentioned above, a zone plate diffractive optical surface has a different dispersion property from that of a conventional reflective/refractive optical system. Namely, while the reciprocal relative dispersion ν of a transparent material is given by $\nu = (N_2-1)/(N_1-N_3)$, reciprocal relative dispersion of a zone plate diffractive optical surface is expressed by $(\lambda_1 - \lambda_3)/\lambda_2$. Here, wavelengths $\lambda_1$, $\lambda_2$, and $\lambda_3$ are in a relationship of $\lambda_1 < \lambda_2 < \lambda_3$, and $N_1$, $N_2$, and $N_3$ are refractive indices corresponding to the respective wavelengths.

For example, the difference in dispersion between refraction versus employing a zone plate diffractive optical surface will now be described using specific numerical values. In general, when a semiconductor laser λ=780 nm, is used as the light source (as is common in digital copiers or optical printers), and if $\lambda_1$=760 nm, $\lambda_2$=780 nm, and $\lambda_3$=800 nm, whereas the reciprocal relative dispersion ν of BK-7 glass is 612, the reciprocal relative dispersion ν of a zone plate diffractive optical surface becomes −19.5 at a similar wavelength. Thus the difference in reciprocal relative dispersion is one order of magnitude and the sign is opposite. The reason why the wavelength λ is set to 780 nm±20 nm is that the wavelength shift range of a semiconductor laser due to mode hopping has a range of approximately ±20 nm about the base wavelength.

By utilizing a zone plate diffractive optical surface, the optical scanner of this invention can effectively correct chromatic aberration even when the collimating lens 3 is formed of a single lens element.

Next, the zone plate diffractive optical surface to be formed on the collimating lens 3 will be explained.

By satisfying Condition (1), chromatic aberrations are corrected by the zone plate diffractive optical surface to thereby correct what is termed "focus error" due to mode hopping of the semiconductor laser. Namely, by forming on at least one surface of the collimating lens 3 a zone plate diffractive optical surface having a focal distance that satisfies Condition (1), focus error on the scanning target 7 caused by mode hopping can be reduced.

Chromatic aberration $\Delta_1$ occurring at the collimating lens 3 is expressed by the following Equation (2).

$$\Delta_1 = F_1^2 \times ((\nu_1 \times f_1)^{-1} + ((\nu_D \times f_D)^{-1}))$$ Equation (2)

where $F_1$ is the Focal distance of the collimating lens 3, $f_1$ is the focal distance due to refraction effect of the collimating lens 3, $f_D$ is the focal distance of the zone plate diffractive section of the collimating lens 3, $\nu_1$ is the reciprocal relative dispersion of the collimating lens 3 material at the base wavelength ±20 nm, and $\nu_D$ is the reciprocal relative dispersion of the zone plate diffractive section of the collimating lens 3 at the base wavelength ±20 nm.

If a zone plate diffractive optical surface is formed on the collimating lens 3, the lens power will be a composite of refractive/diffractive optical power. The term "focal distance due to refraction effect of the collimating lens" refers to the focal distance due only to refraction, and the term "focal distance of the diffractive section of the collimating lens" refers to the focal distance due to the composite refractive/diffractive power of the lens.

The "reciprocal relative dispersion of the collimating lens 3 material at the base wavelength ±20 nm" $\nu_1$ is expressed by the following Equation (3).

$$\nu_1 = (N_{1B} - 1)/(N_{1A} - N_{1C})$$ Equation (3)

where $N_{1A}$ is the refractive index of the collimating lens 3 material at the base wavelength −20 nm, $N_{1B}$ is the refractive index of the collimating lens 3 material at the base wavelength, and $N_{1C}$ is the refractive index of the collimating lens 3 material at the base wavelength +20 nm.

Once again, the reason to set a range of the base wavelength ±20 nm is to correspond to the wavelength shift range due to mode hopping of the semiconductor laser. If correction for chromatic aberration is achieved in this range, an optical scanner that sufficiently corrects for mode hopping can be achieved.

Also, the "reciprocal relative dispersion of the diffractive section of the collimating lens 3 at the base wavelength ±20 nm" $\nu_D$ is expressed by the following Equation (4).

$$\nu_D = \lambda_B / (\lambda_A - \lambda_C)$$ Equation (4)

where $\lambda_A$ is the base wavelength −20 nm, $\lambda_B$ is the base wavelength, and $\lambda_C$ is the base wavelength +20 nm.

The focus error $\Delta'$ on the scanning target 7 caused by mode hopping is expressed by the following Equatation (5).

$$\Delta' = \Delta_1 \times (F_2/F_1)^2$$ Equation (5)

where $F_1$ is the focal distance of the collimating lens 3, and $F_2$ is the focal distance of the image-forming optical system 6.

Thus, the focus error $\Delta'$ on the scanning target caused by mode hopping is the chromatic aberration $\Delta_1$ generated at the collimating lens 3 magnified by $(F_2/F_1)^2$.

Satisfying the following Equation (6) insures that this $\Delta'$ becomes smaller than the specified value (0.01×$F_2$).

$$\Delta_1 \times (F_2/F_1)^2 < 0.01 \times F_2$$ Equation (6)

Dividing both sides of Equation (6) by $F_2$ then gives Condition (1).

In this way, Condition (1) regulates the focus error on the scanning target 7 caused by mode hopping to insure that it is less than 1% of the focal distance of the image-forming optical system 6. By making the collimating lens 3 be equipped with a zone plate diffractive optical surface whose diffractive section has a focal distance $f_D$ satisfying the Condition (1), even when wavelength shift occurs due to the mode hopping of a semiconductor laser, chromatic aberration of the scanning target 7 can be reduced and a high-resolution output can be maintained.

Below, two embodiments of the invention are explained in detail.

Embodiment 1

Listed in Table 1 are the surface number #, in order form the object side, the radius of curvature R (in mm) of each lens element surface, the on-axis spacing D (in mm) between each lens element surface, and the refractive index N at wavelengths 760 nm, 780 nm, and 800 nm of each lens element from a light source 1 to a collimating lens 3 for this embodiment. In the lower part of Table 1 are listed the values of the constants in the zone plate diffractive optical surface depth formula.

In Table 1, a * mark on the right side of a surface number # indicates that the surface includes a zone plate diffractive optical surface.

TABLE 1

| Surface # | Radius of Curvature (R) | On-Axis Surface Spacing (D) | $N_{<760>}$ | $N_{<780>}$ | $N_{<800>}$ |
|---|---|---|---|---|---|
| 1 (Light source) | | 9.101 | | | |
| 2 | ∞ | 0.25 | 1.51161 | 1.51118 | 1.51077 |
| 3 | ∞ | 0.0 | | | |
| 4 | 180.38 | 1.2 | 1.58771 | 1.58722 | 1.58676 |
| 5* | −6.2470 | | | | |

Value of Constants of Zone Plate Diffractive Optical Surface (5th Surface)

| | |
|---|---|
| B = −12.015241 | $A_4 = 1.0341085 \times 10^{-7}$ |
| $A_2 = 3.1719040 \times 10^{-4}$ | $A_5 = 2.8596807 \times 10^{-9}$ |
| $A_3 = 6.3844654 \times 10^{-6}$ | K = 0.9982824 |

In Embodiment 1, although the distance $D_3$ between the cover glass 2 and the collimating lens 3 is set to be 0.0 mm, any arbitrary distance can also be used, as shown in FIG. 2.

Listed in Table 2 are values corresponding to Condition (1) for Embodiment 1. As shown in the lower part of Table 2, Condition (1) is satisfied.

TABLE 2

| $F_1$ = 10.00 | $F_2$ = 210 |
|---|---|
| $f_1$ = 10.31 | $f_D$ = 335.21 |
| $v_1$ = 618.1 | $v_D$ = −19.5 |
| $A_1$ = 0.00039 | |

Condition (1) value: $| A_1 \times F_2 / F_1^2 | = 0.00082$

Embodiment 2

In the same way as in Embodiment 1, in the optical scanner of Embodiment 2, the collimating lens 3 consists of one lens where a zone plate diffractive optical surface is formed on one face on the side of the scanning target 7. This diffractive optical surface is expressed by a diffractive optical surface depth formula as in Embodiment 1, and also satisfies Condition (2) above.

The chromatic aberration correction effect of the zone plate diffractive optical surface of this embodiment is similar to that of the Embodiment 1. Below, an explanation is provided of Condition (2) that was not explained above in discussing Embodiment 1.

The left side of Condition (2) is the addition of $\Delta'$ expressed in the said Equation (6) and the chromatic aberration $\Delta_2$ caused by mode hopping at the image-forming optical system 6. Namely, Condition (2) regulates so that addition of chromatic aberration $\Delta'$ which is a focus error caused by mode hopping magnified by the collimating lens 3 on the scanning target 7 and chromatic aberration $\Delta_2$ caused by mode hopping at the image-forming optical system 6 becomes smaller than the specified value (0.01×$F_2$) in the right side.

The chromatic aberration $\Delta_2$ occurring at the image-forming optical system is expressed by the following Equation (7).

$$\Delta_2 = F_2/v_2 \quad \text{Equation (7)}$$

where $F_2$ is the focal distance of the image-forming optical system 6, and $v_2$ is the equivalent reciprocal relative dispersion of the image-forming optical system 6 at the base wavelength ±20 nm.

The above value of $v_2$ is calculated by converting the reciprocal relative dispersions of plural lenses into the reciprocal relative dispersion of a single lens, and is expressed by the following Equation (8).

$$v_2 = 1/(\sigma(v_{2i} \times f_{2i})^{-1}) \times F_2) \quad \text{Equation (8)}$$

where $v_{2i}$ is the reciprocal relative dispersion of the i-th lens of the image-forming optical system 6, and $f_{2i}$ is the focal distance of the i-th lens of the image-forming optical system 6.

The above "reciprocal relative dispersion of the i-th lens of the image-forming optical system 6" $v_{2i}$ is expressed by the following Equation (9).

$$v_{2i} = (N_{2B} - 1)/(N_{2A} - N_{2C}) \quad \text{Equation (9)}$$

where $N_{2A}$ is the refractive index of the i-th lens material of the image-forming optical system 6 at the base wavelength −20 nm $N_{2B}$ is the refractive index of the i-th lens material of the image-forming optical system 6 at the base wavelength, and $N_{2C}$ is the refractive index of the i-th lens material of the image-forming optical system 6 at the base wavelength +20 nm.

In this way, Condition (2) regulates so that focus occurring due to mode hopping when passing through the collimating lens 3 and the image-forming optical system 6 becomes less than 1% of focal distance of the image-forming optical system 6. By making the collimating lens 3 equipped with a zone plate diffractive optical surface whose diffractive section has the focal distance $f_D$ satisfying this Condition (2), even when wavelength shift occurs due to mode hopping of the semiconductor laser source, chromatic aberration occurring when passing through the collimating lens 3 and the image-forming optical system 6 can be reduced and a high-resolution output can be maintained.

Listed in Table 3 are the surface number #, in order form the object side, the radius of curvature R (in mm) of each lens element surface, the on-axis spacing D (in mm) between each lens element surface, and the refractive index N at wavelengths 760 nm, 780 nm, and 800 nm of each lens element from a light source 1 to a collimating lens 3 for this embodiment. In the lower part of Table 1 are listed the values of the constants in the zone plate diffractive optical surface depth formula. A * mark on the right side of a surface number # indicates that the surface includes a zone plate diffractive optical surface.

TABLE 3

| Surface Number # | Radius of Curvature (R) | On-Axis Surface Spacing (D) | $N_{<760>}$ | $N_{<780>}$ | $N_{<800>}$ |
|---|---|---|---|---|---|
| C1 (Light source) | | 9.097 | | | |
| C2 | ∞ | 0.25 | 1.51161 | 1.51118 | 1.51077 |
| C3 | ∞ | 0.0 | | | |
| C4 | 202.75 | 1.2 | 1.58771 | 1.58722 | 1.58676 |
| C5* | −6.2435 | | | | |

Value of Constants of Zone plate Diffractive Optical Surface (5th Surface)

| B = −13.199948 | $A_4$ = 1.0729839 × $10^{-7}$ |
|---|---|
| $A_2$ = 3.1407493 × $10^{-4}$ | $A_5$ = 2.5678947 × $10^{-9}$ |
| $A_3$ = 6.3317991 × $10^{-6}$ | K = 0.9983076 |

Listed in Table 4 are the surface number # in order form the object side, the radius of curvature R (in mm) of each lens element surface, the on-axis spacing D (in mm) between each lens element surface, and the refractive index N at wavelengths 760 nm, 780 nm, and 800 nm of each lens element from the optical reflective surface 5a of an optical polarizer 5 to the scanning target 7 for Embodiment 2.

TABLE 4

| Surface # | Radius of Curvature (R) | Distance between Surfaces (D) | $N_{<760>}$ | $N_{<780>}$ | $N_{<800>}$ |
|---|---|---|---|---|---|
| i1 (Polarizing reflective surface) | ∞ | 12.24 | | | |
| i2 | −240.05 | 11.33 | 1.71334 | 1.71222 | 1.71118 |
| i3 | ∞ | 18.0 | | | |
| i4 | ∞ | 23.33 | 1.71334 | 1.71222 | 1.71118 |

TABLE 4-continued

| Surface # | Radius of Curvature (R) | Distance between Surfaces (D) | $N_{<760>}$ | $N_{<780>}$ | $N_{<800>}$ |
|---|---|---|---|---|---|
| i5 | −102.58 | 233.73 | | | |
| i6 (scanning target) | | | | | |

In this Embodiment also, although the distance $D_{C3}$ between the cover glass 2 and the collimating lens 3 is set to 0.0 mm, an arbitrary distance can be made in the same way as in Embodiment 1.

Listed in Table 5 are the values corresponding to Condition (2) in this Embodiment 2. As listed in Table 5, this Embodiment 2 satisfies Condition (2).

TABLE 5

| | |
|---|---|
| $F_1 = 10.00$ | $F_2 = 209.91$ |
| $f_1 = 10.34$ | $f_D = 305.13$ |
| $v_1 = 618.1$ | $vD = -19.5$ |
| $v_2 = 396.70$ | |
| $\Delta_1 = -0.00115$ | |
| $\Delta_2 = 0.52937$ | |

Condition 2 value: $|\Delta_1 \times (F_2 / F_1)^2 + \Delta_2| = 0.02029 \approx F_2 \times 9.663 \times 10^{-6}$ The optical scanner of this invention is not intended to be limited to those disclosed in the listed embodiments, as those of ordinary skill in the art will recognize that alterations may be made without departing from the spirit and scope of the invention. For example, the radius of curvature R of each lens and the spacings D between surfaces D can be changed appropriately, and a zone plate diffractive optical surface can be formed either only on the light-source side of the collimating lens or on both sides of the collimating lens. Also, other construction details, such as the number or shape of optical elements in the image-forming optical system, are not limited to those disclosed in the specific embodiments but can be changed.

As explained above, according to the optical scanner of this invention, by adding a zone plate diffractive optical surface to a collimating lens surface, it is possible to obtain an optical system with reduced chromatic aberration even in an optical scanner equipped with a collimating lens formed of a single lens element or with an image-forming optical system having only a few lens elements and, by satisfying specified conditions, it is possible to obtain an optical scanner that can maintain high-resolution output even when wavelength shifts occur due to mode hopping of a semiconductor laser used as a light source in the optical scanner.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An optical scanner comprising:

a semiconductor laser light source;

a collimating lens having at least one surface that includes a zone plate structure, said collimating lens converting light from said light source into nearly-collimated beam, an optical scanner/polarizer that scans the nearly-collimated light beam repeatedly in one dimension and which polarizes the light that is scanned, an image-forming optical system that images light from the optical scanner/polarizer onto a target, and wherein the following condition is satisfied:

$$|\Delta_1 \times F_2/F_1^2| < 0.01$$

where $\Delta_1 = F_1^{2} \times \{(v_1 \times f_1)^{-1} + ((v_D \times f_D)^{-1})\}$ $F_1$ is the focal distance of the collimating lens, $F_2$ is the focal distance of the image-forming optical system, $f_1$ is the focal distance due to the refraction effect of the collimating lens, (i.e., without a zone plate diffractive surface being added)

$f_D$ is the focal distance of the diffractive section of the collimating lens, (i.e., with a zone plate diffractive surface being added)

$v_1$ is the reciprocal relative dispersion of the collimating lens material at the base wavelength ±20 nm, and $v_D$ is the reciprocal relative dispersion of the diffractive section of the collimating lens at the base wavelength ±20 nm.

2. An optical scanner comprising:

a semiconductor laser light source;

a collimating lens having at least one surface that includes a zone plate structure, said collimating lens converting light from said light source into nearly-collimated beam, an optical scanner/polarizer that scans the nearly-collimated light beam repeatedly in one dimension and which polarizes the light that is scanned, an image-forming optical system that images light from the optical scanner/polarizer onto a target, wherein the following condition is satisfied:

$$|\Delta_1 \times (F_2/F_1)^2 + \Delta_2| < F_2/100$$

where $\Delta_1 = F_1^{2} \times \{(v_1 \times f_1)^{-1} + ((v_D \times f_D)^{-1})\}$ $\Delta_2 = F_2/v_2$ $F_1$ is the focal distance of the collimating lens, $F_2$ is the focal distance of the image-forming optical system, $f_1$ is the focal distance due to the refraction effect of the collimating lens, (i.e., without a zone plate diffractive surface being added)

$f_D$ is the focal distance of the diffractive section of the collimating lens, (i.e., with a zone plate diffractive surface being added)

$v_1$ is the reciprocal relative dispersion of the collimating lens material at the base wavelength ±20 nm, $v_2$ is the equivalent reciprocal relative dispersion of the image-forming optical system at the base wavelength ±20 nm, and $v_D$ is the reciprocal relative dispersion of the diffractive section of the collimating lens at the base wavelength ±20 nm.

* * * * *

UNITED STATES PATENT AND TRADEMARK OFFICE
CERTIFICATE OF CORRECTION

PATENT NO. : 6,101,020  
DATED : August 8, 2000  
INVENTOR(S) : Ori

Page 1 of 2

It is certified that error appears in the above-indentified patent and that said Letters Patent is hereby corrected as shown below:

In column 1, at line 6, change "fight" to -- light --;

In column 2, at line 6, change "$\Delta_1''$" to -- $\Delta'$ --;

In column 2, at line 12, change "$\Delta_1''$" to -- $\Delta$ --;

In column 2, at line 15, change "$\Delta_1''$" to -- $\Delta$ --;

In column 7, Equation (8) should read as follows:

$$v_2 = 1 / (\Sigma (v_{2i} \times f_{2i})^{-1}) \times F_2) \quad \ldots \text{Equation (8)}$$

In column 9, the last entry in Table 5, right column, should be:

$$v_D = -19.5$$

UNITED STATES PATENT AND TRADEMARK OFFICE
CERTIFICATE OF CORRECTION

PATENT NO. : 6,101,020
DATED : August 8, 2000
INVENTOR(S) : Ori

It is certified that error appears in the above-indentified patent and that said Letters Patent is hereby corrected as shown below:

In column 10, at line 12, the equation should read as follows:

$$\Delta_I = F_I^2 \times \{ (v_I \times f_I)^{-1} + ((v_D \times f_D)^{-1} \}$$

Signed and Sealed this

Seventeenth Day of April, 2001

Attest:

NICHOLAS P. GODICI

*Attesting Officer*    Acting Director of the United States Patent and Trademark Office